(12) United States Patent
Elichaa

(10) Patent No.: US 7,911,772 B2
(45) Date of Patent: Mar. 22, 2011

(54) ASSEMBLY AID FOR REPLACING KEYS ON A KEY PAD

(76) Inventor: Joseph Elichaa, Auburn, ME (US)

( * ) Notice: Subject to any disclaimer, the term of this patent is extended or adjusted under 35 U.S.C. 154(b) by 94 days.

(21) Appl. No.: 12/389,046

(22) Filed: Feb. 19, 2009

(65) Prior Publication Data
US 2009/0207561 A1 Aug. 20, 2009

Related U.S. Application Data

(60) Provisional application No. 61/029,733, filed on Feb. 19, 2008.

(51) Int. Cl.
H05K 5/00 (2006.01)
H05K 7/00 (2006.01)
(52) U.S. Cl. .............................. 361/679.08; 361/679.09
(58) Field of Classification Search ............. 361/679.08, 361/679.09
See application file for complete search history.

(56) References Cited

U.S. PATENT DOCUMENTS

| 6,084,644 | A | * | 7/2000 | Atkinson | 348/734 |
| 2002/0008610 | A1 | * | 1/2002 | Peterson | 340/5.64 |
| 2008/0068248 | A1 | * | 3/2008 | Iwai | 341/176 |

* cited by examiner

Primary Examiner — Jayprakash N Gandhi
Assistant Examiner — Anthony M Haughton
(74) Attorney, Agent, or Firm — Patricia M. Mathers

(57) ABSTRACT

Assembly aid for installing or replacing keys on a telephone or other device with a key pad. The assembly aid has a retainer with recesses or apertures for holding keys. The keys are held in the retainer by means of an interference fit. The arrangement of keys on the retainer corresponds in layout to the layout of keys on the key pad. The retainer is placed against the inside surface of the face plate of the key pad, with the keys aligned with their appropriate apertures in the face plate. The keys are released from the retainer into the apertures simply by applying pressure against the key from the rear side of the retainer.

10 Claims, 2 Drawing Sheets

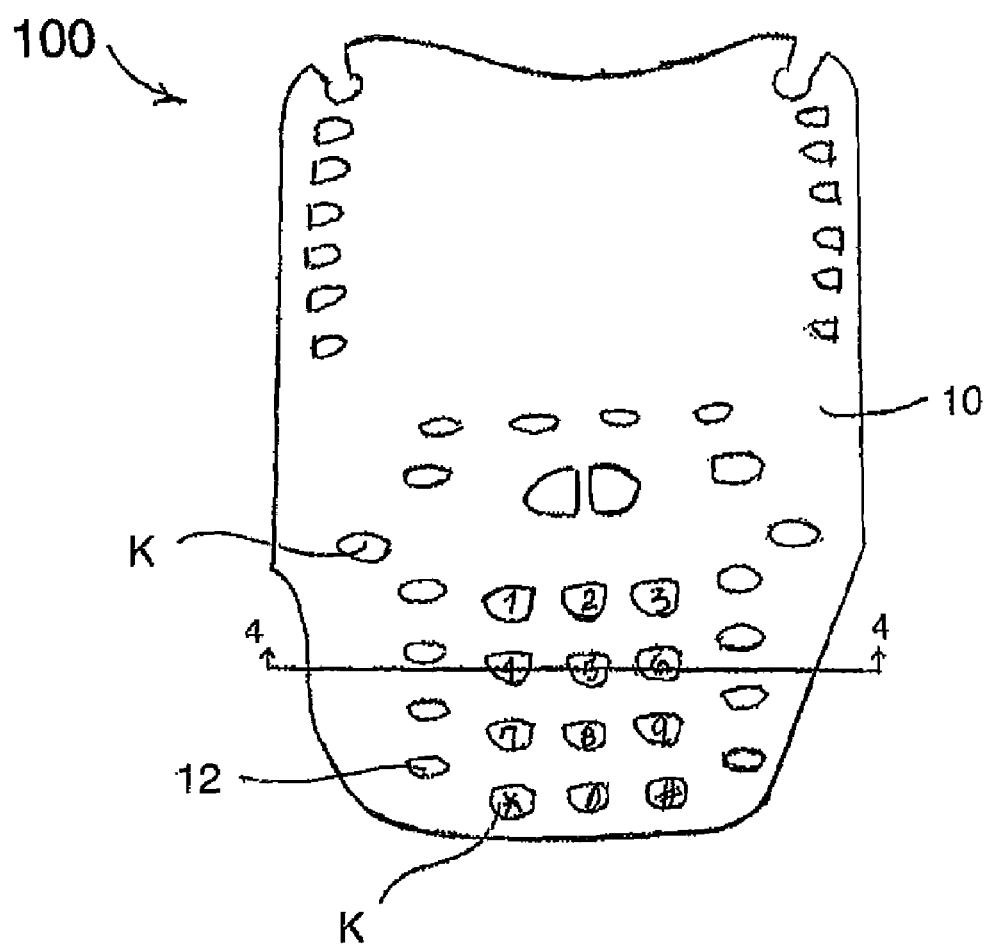
FIG. 3
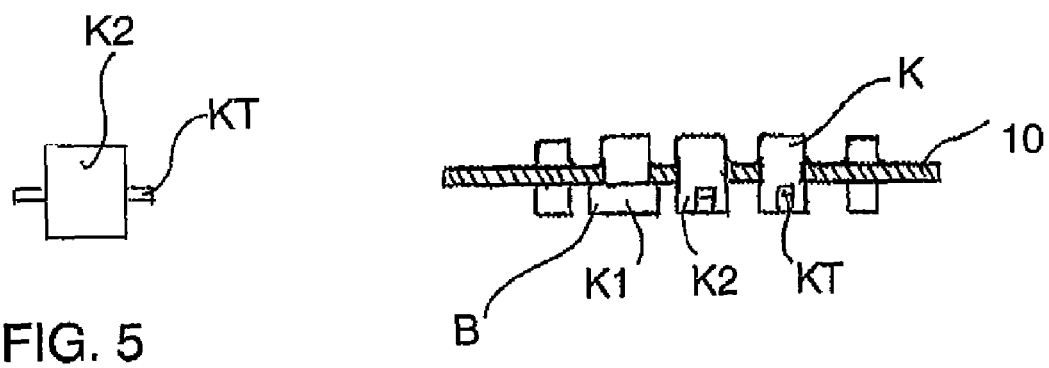
FIG. 5
FIG. 4

ASSEMBLY AID FOR REPLACING KEYS ON A KEY PAD

BACKGROUND INFORMATION

1. Field of the Invention

The invention relates to assembly aids. More particularly, the invention relates to an assembly aid for replacing or assembling sets of keys or buttons on a device.

2. Description of the Prior Art

The buttons or keys on a telephone often become worn or discolored and, for this and other reasons, are sometimes replaced. The same problem applies to other devices that have key pads with sets of keys or buttons. It is a difficult and time-consuming task to replace these buttons, because each button has a specific function imprinted on its face. For example, icons, numbers, and/or letters are printed on the faces of buttons for telephones or other types of devices with function keys. Each key, then, as to be placed in a very particular location within the button set on the device.

What is needed is an assembly aid that will facilitate manual replacement of the keys on a key pad. What is further needed is such an aid that will facilitate manual replacement of sets of keys.

BRIEF SUMMARY OF THE INVENTION

The invention is a retainer for a set of keys or buttons, such as are used on a telephone, key pad, keyboard, programmable device, electrical appliance, etc. The types of keys include actuation keys, line keys, feature keys, selection keys, etc. The retainer is essentially a sheet of material that is formed to hold a set of buttons or keys for a particular model of a device. A series of recesses or apertures is stamped or pressed into the sheet. The recesses or apertures are dimensioned so as to firmly hold a button, such that, if the sheet is turned upside down, the buttons do not drop away from the sheet without some external force being applied to them.

The recesses or apertures are spaced apart on the sheet to correspond to the location and spacing of the buttons on the actual device, i.e., the telephone, the keyboard, etc. The buttons are inserted into the retainer so that the front faces of the buttons are facing upward.

The buttons are installed from the inside surface of the housing for the telephone or other device. The retainer is turned upside down and aligned with the apertures in the housing that are provided to receive the buttons. Each button in the retainer is now situated above its appropriate aperture in the housing. The buttons are released from the retainer into their apertures in the housing by pressing on the back of the retainer, so that the buttons pop out of the recesses or the apertures and drop into the aperture in the housing.

BRIEF DESCRIPTION OF THE DRAWINGS

The present invention is described with reference to the accompanying drawings. In the drawings, like reference numbers indicate identical or functionally similar elements. The drawings are not to scale.

FIG. 3 is a plane view of a second embodiment of the assembly aid according to the invention.

FIG. 4 is a cross-sectional view of the assembly aid of FIG. 3.

FIG. 5 is an illustration of a tabbed key.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art. Elements that are functionally identical carry the same reference designation throughout the description.

Figure 1:
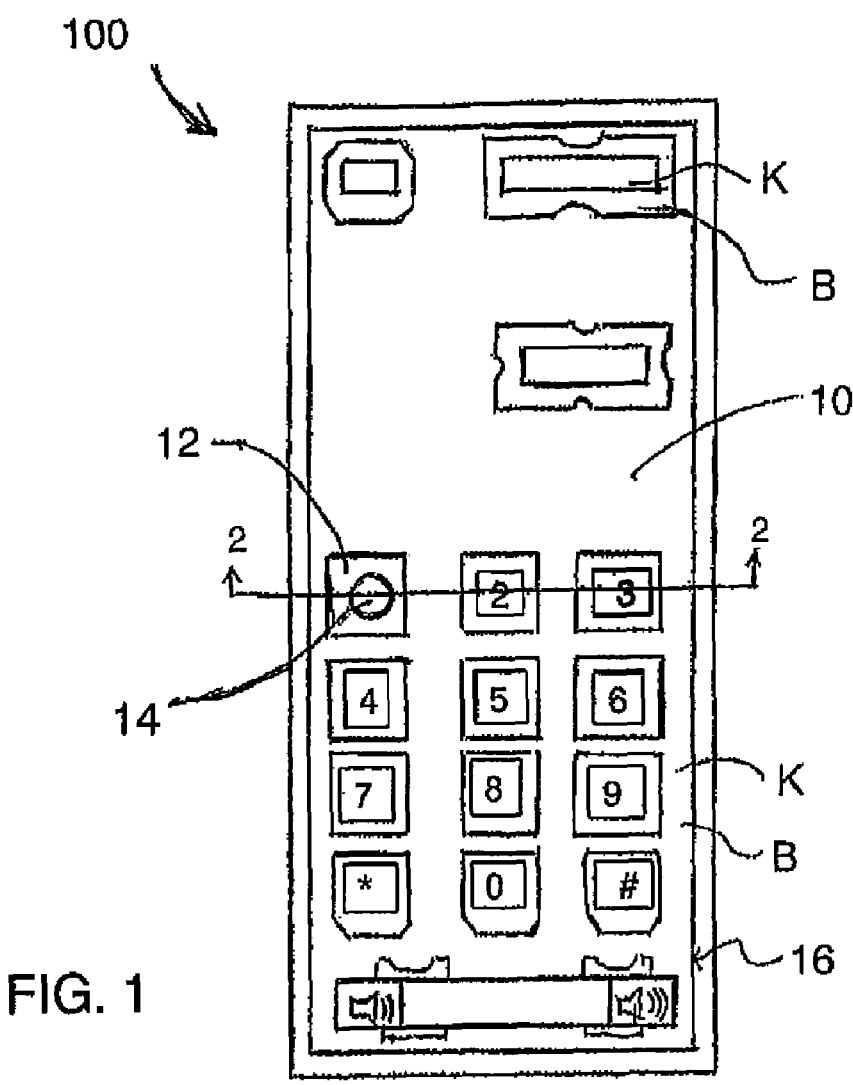
FIG. 1 is a top plane view of the assembly aid according to the invention.
Figure 2:
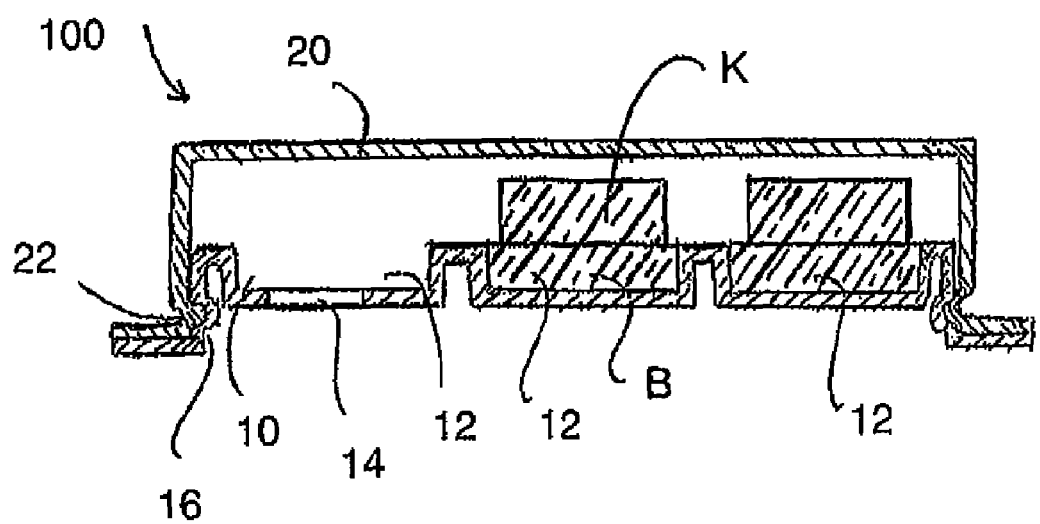
FIG. 2 is a cross-sectional view of a first embodiment of the assembly aid.

FIG. 1 is a plane view of an assembly aid 100 for installing or replacing buttons or keys K for a telephone or other device that is operated by means of a key pad, or a keyboard. The layout of the keys K in this view corresponds to the layout of keys in a key pad on a particular device. It is understood, that different buttons and different layouts of buttons will be required for different devices. FIG. 2 is a cross-sectional view, drawn to a larger scale, of a first embodiment of the invention. Each key K has a base B that is greater in width and/or height than the key itself. The base B, when installed in the device, remains behind the face plate of the key pad, with only the key K protruding through an aperture in the face plate, so that it is accessible for actuation. The assembly aid 100 comprises a retainer 10, which has a series of retainer openings 12, such as recesses or apertures, shown in FIG. 2. For purposes of illustration, the first key K has been removed. The retainer opening 12 is dimensioned such that it securely holds the key K in place by means of an interference or friction fit. The retainer 10 in FIGS. 1 and 2 is shown face side up. The retainer openings 12 in this embodiment are recesses with side walls that are dimensioned to hold the key by means of an interference or friction fit. This makes it possible to hold the retainer 10 face side down, without the keys K dropping out of the retainer 10 simply by force of gravity.

The assembly aid 100 is constructed to hold a complete set of keys K for a particular key pad. The recesses 12 are spaced such, that the arrangement of the keys K in the retainer 10 corresponds closely to the arrangement of the keys on the key pad itself. To assemble the keys K in the key pad, the user places the assembly aid 100 with its face side facing toward the inside surface of the face plate of the key pad, with the keys K properly aligned over the appropriate apertures in the face plate. Applying a pressure on the rear side of the retainer 10 against the base B of the key K will force the key out of the recess 12 and into the aperture in the face plate. Depending on the size of the keys or the stiffness of the material used for the retainer 10, it may be desirable to provide an opening 14 in the retainer 10, beneath the base B, to allow more directed application of pressure against the base B.

Optionally, a cover 20 may be provided for the retainer 10, to protect the keys K during shipping and handling. In the embodiment shown, the retainer 10 has a side wall 16, and the cover 20 fits snugly over this wall. An interlocking means 22 may be provided in the retainer 10 and cover 20 to prevent the cover 20 from inadvertently releasing from the retainer 10.

The material used for the retainer 10 for this first embodiment is a plastic material that is typically used for blister-type packaging. Suitable materials include films made of polyvinyl chloride, polypropylene, polyester, and polyethylene terephthalate. The material has a certain flexibility to it, which makes it possible to provide an interference fit around the keys K or the base B of the keys. Ideally, the same material is used for the cover 20, although it is understood that any material that is suitable for this purpose may be used.

FIGS. 3 and 4 illustrate a second embodiment of the assembly aid 100. The retainer 10 in this embodiment is a sheet with apertures 12. As with the first embodiment, apertures 12 are also sized such, that a slight friction fit prevents the keys K from dropping out of the retainer 10, unless an external force is applied. A suitable material for this type of retainer 10 is a foam sheet that has some flexibility to it, so as to allow the retainer 10 to conform to the contour of the face plate of the key pad for which the keys K are intended. One example of a suitable foam is ethylene vinyl acetate (EVA).

The assembly aid 100 with the retainer 10 that is a flexible sheet of foam material may be placed inside a protective case for shipping and storage purposes, although it is also possible to store a plurality of such assembly aids 100 in a single carton. The key K may be a tabbed key K2, as shown in FIG. 5, or may be a key with a base, K1, or may be a simple straight-sided key. Both the key tab KT and the base B are constructions to prevent the key K from slipping out of the retainer 10 inadvertently and these two constructions are given by way of example only. It is understood, that the term "key" also includes keys with other constructions to prevent the key K from inadvertently slipping from its aperture 12 in the retainer 10.

It is understood that the embodiments described herein are merely illustrative of the present invention. Variations in the construction of the assembly aid may be contemplated by one skilled in the art without limiting the intended scope of the invention herein disclosed and as defined by the following claims.

What is claimed is:

1. Assembly aid for transferring keys onto a key pad, said assembly aid comprising:
    a retainer having a series of retainer openings, each opening adapted to securely yet releasably hold a key; and
    a set of keys placed in the retainer, such that a first retainer face of the retainer shows a first key-face of each key, the first key face being that face that is exposed for actuation by an operator operating the key pad when the each key is assembled in the key pad, and a second retainer face of the retainer shows a second key face that is opposite the first key face;
    wherein the retainer openings are arranged on the retainer to correspond to the layout of apertures for keys on a face plate of the key pad;
    wherein, when the retainer is placed on an inside surface of the face plate, the each key may be pressed out of the retainer into a corresponding aperture, without having to reposition the retainer on the face plate; and
    wherein, when the retainer is turned with the first retainer face facing downward, the keys are held in the retainer until pressure is applied to the second key face to force the key out of the retainer.

2. The assembly aid of claim 1, wherein the retainer is constructed of polyvinylchloride.

3. The assembly aid of claim 1, wherein the retainer is constructed of polypropylene.

4. The assembly aid of claim 1, wherein the retainer is constructed of polyester.

5. The assembly aid of claim 1, wherein the retainer is constructed of polyethylene terephthalate.

6. The assembly aid of claim 1, wherein the retainer is constructed of a foam fabric.

7. The assembly aid of claim 6, wherein the foam is ethylene vinyl acetate.

8. The assembly aid of claim 1, wherein the retainer openings are recesses, each recess dimensioned to hold a corresponding key by means of an interference fit.

9. The assembly aid of claim 1, wherein the retainer openings are apertures, each aperture dimensioned to hold a corresponding key by means of an interference fit.

10. The assembly aid of claim 1 further comprising a cover, wherein the retainer forms a package base and the cover snap-fits with the package base.

\* \* \* \* \*